(12) United States Patent
Keindorf et al.

(10) Patent No.: US 9,869,106 B2
(45) Date of Patent: Jan. 16, 2018

(54) CONCRETE CONSTRUCTION OF MODULAR DESIGN

(71) Applicant: DRÖSSLER GMBH UMWELTTECHNIK, Siegen (DE)

(72) Inventors: Christian Keindorf, Oebisfelde (DE); Dirk Wagner, Hannover (DE); Peter Lenzing, Kreuztal (DE); Michael Stahl, Reichshof (DE)

(73) Assignee: DROESSLER GMBH UMWELTTECHNIK, Siegen (DE)

( * ) Notice: Subject to any disclaimer, the term of this patent is extended or adjusted under 35 U.S.C. 154(b) by 0 days.

(21) Appl. No.: 15/500,727

(22) PCT Filed: Jul. 2, 2015

(86) PCT No.: PCT/EP2015/065091

§ 371 (c)(1),
(2) Date: Feb. 16, 2017

(87) PCT Pub. No.: WO2016/026603

PCT Pub. Date: Feb. 25, 2016

(65) Prior Publication Data

US 2017/0218650 A1 Aug. 3, 2017

(30) Foreign Application Priority Data

Aug. 18, 2014 (DE) .......... 10 2014 216 364
Jan. 8, 2015 (DE) .......... 10 2015 200 105

(51) Int. Cl.
*E04H 12/12* (2006.01)
*E04C 2/38* (2006.01)
(Continued)

(52) U.S. Cl.
CPC .......... *E04H 12/12* (2013.01); *E04C 2/28* (2013.01); *E04C 2/384* (2013.01); *E04C 5/12* (2013.01);
(Continued)

(58) Field of Classification Search
CPC . E04H 12/12; E04C 2/384; E04C 5/12; E04C 2/28; F05B 2250/283; F03D 13/20
See application file for complete search history.

(56) References Cited

U.S. PATENT DOCUMENTS 2,783,721 A * 3/1957 Molke .............. E04B 7/08
52/223.6
4,781,006 A * 11/1988 Haynes ............ E04B 1/215
52/583.1
(Continued)

FOREIGN PATENT DOCUMENTS

DE 821403 B 11/1951
DE 2249198 A 10/1972
(Continued)

*Primary Examiner* — Jeanette E Chapman
(74) *Attorney, Agent, or Firm* — Andrew Wilford (57) ABSTRACT

The invention relates to a concrete construction of modular design, comprising at least two upright precast concrete wall elements (7, 7', . . . , 7''') which are arranged next to one another and, where appropriate, above one another and have two narrow sides, an upper and a lower side and a front and a rear side, wherein a first honeycomb support (1) is anchored in one of the narrow sides and the opposite narrow side has a recess or depression (8) in which a further honeycomb support (1') is anchored in such a way that, when mounting the narrow sides of the two precast concrete wall elements (7, 7'), the two honeycomb supports (1, 1') can be connected by connecting means (9) with the formation of the vertical joint (16).

8 Claims, 8 Drawing Sheets

(51) Int. Cl.
 *E04C 2/28* (2006.01)
 *E04C 5/12* (2006.01)
 *F03D 13/20* (2016.01)

(52) U.S. Cl.
 CPC ........ *F03D 13/20* (2016.05); *F05B 2250/283* (2013.01)

(56) References Cited

U.S. PATENT DOCUMENTS

| | | | |
|---|---|---|---|
| 4,819,394 A * | 4/1989 | Compton | E04B 1/215 52/252 |
| 5,131,201 A * | 7/1992 | Larson | E04H 12/30 52/223.3 |
| 6,494,639 B1 * | 12/2002 | Friend | E04B 1/043 403/205 |
| 7,160,085 B2 | 1/2007 | deRoest | |
| 2007/0006541 A1 * | 1/2007 | Seidel | E02D 27/42 52/292 |
| 2011/0107711 A1 * | 5/2011 | Foley | E04B 1/2403 52/655.1 |
| 2014/0202107 A1 | 7/2014 | Brughuis | |

FOREIGN PATENT DOCUMENTS

| | | | | |
|---|---|---|---|---|
| DE | 2548959 B1 * | 2/1977 | | E04B 1/046 |
| DE | 3024647 A | 1/1982 | | |
| DE | 20013774 U | 12/2000 | | |
| DE | 102011118113 A | 2/2013 | | |
| DE | 102011054497 A | 4/2013 | | |
| EP | 0945554 A | 9/1999 | | |
| EP | 2108753 A1 * | 10/2009 | | E04B 1/043 |

\* cited by examiner

CONCRETE CONSTRUCTION OF MODULAR DESIGN

CROSS REFERENCE TO RELATED APPLICATIONS

This application is the US-national stage of PCT application PCT/EP2015/065091 filed 2 Jul. 2015 and claiming the priority of German patent application 102014216364.1 itself filed 18 Aug. 2014 and German patent application 102015200105.9 itself filed 8 Jan. 2015.

FIELD OF THE INVENTION

The invention relates to a concrete construction of modular form for tower structures consisting of at least two upright precast concrete wall elements that are optionally arranged alongside one another and optionally arranged one above the other with two narrow sides that after joining together of the precast concrete wall elements include a vertical joint therebetween, an upper side and a lower side that after joining together of the precast concrete wall elements include a horizontal joint therebetween, and a front and a rear side.

BACKGROUND OF THE INVENTION

Concrete constructions of that kind can be hybrid towers that are composed of precast concrete wall elements of wind power-generating installations or also walls of large and high containers or buildings.

DE 10 2011 054 497 A1 already discloses a silo of concrete precast parts with concrete rings that consist of a plurality of ring segments and that are connected with at least one screw connection by means of connecting anchors embedded in the concrete material of the ring segments. The individual ring segments are thus connected together by way of screws that are loaded in tension and that are led through the anchor plates of the precast concrete elements.

Moreover, according to DE 821 403 C concrete constructional elements have anchorages that project from the side walls and the ends of which are constructed in such a way that they are embedded together with the corresponding adjacent elements in cast concrete seams connecting the concrete components. These anchorages can be connected together with corresponding anchorages of adjacent elements preferably through suitably constructed superimposed surfaces such as angle bends annularly formed free ends for welding mutual suspension means and the like.

OBJECT OF THE INVENTION

The invention has the object of constructing a concrete construction in modular form of the kind described above in such a way that simple and secure connection of the precast concrete wall elements is achieved without the need for pointing, for which suitable mortar, concrete or synthetic resin would have to be expensively and cost-intensively introduced on site.

SUMMARY OF THE INVENTION

According to the invention the object is fulfilled in that a first support is anchored in one of the narrow sides and that the opposite narrow side has a recess or depression in which a further support is anchored in such a way that when the narrow sides of the two precast concrete wall elements are assembled to form the vertical joint the two supports partly overlap and are connectable by connecting means.

As a result, a mechanically positive connection between the wall elements can be produced by simple means without requiring injection of mortar. The recesses or depressions receiving the supports can obviously also be provided in both narrow sides of a precast concrete wall element. In that case, the recesses or depressions do not have to be as deep as when only one recess or depression has to receive the supports.

However, these vertical joints can also be used in, for example container construction where corresponding upright precast concrete wall elements are arranged only alongside one another and not also one above the other.

However, according to the invention the object is also fulfilled by arranging a structure bearing, particularly a reinforced elastomer bearing, in a recess or depression of the underside of the precast concrete wall elements, which bearing when a precast concrete wall element is mounted is supported on the upper side of the precast concrete wall element disposed thereunder and forms the horizontal joint.

By way of the structure bearing it is possible to transfer in optimum manner, in particular loads that arise. Mechanically positive connections that make the use of mortar injection superfluous are achieved by way of the structure bearing.

It is obviously possible in the construction of hybrid towers to similarly equip the transition rings that are placed on the uppermost ring of the precast concrete wall elements, and/or adapter rings on the lower side thereof with recesses or depressions receiving the structure bearings that produce a mechanically positive connection between the metal part and the concrete part of the hybrid tower without any need to use connecting mortar.

It is of advantage if for the horizontal joints an edge region formed between front side and upper side is inclined downwardly.

As a result, water that passes from the outside into the horizontal joint can flow out of the joint so that an optimal water removal is ensured.

It is advantageous if the supports consist of a profile member having a flange on which anchoring elements, for example headed bolts protruding into the concrete for anchoring with the precast concrete wall elements are mounted and on which a web for connecting two wall elements together is mounted, wherein the web of the profile member has a honeycomb form.

However, it is also advantageous if the supports consist of a strap having an angled web that has the profile of a honeycomb and that projects from a respective one of the narrow sides, in which case the angle is selected so that the strap extends in a plane substantially parallel to the front side or rear side of a first precast concrete wall element, while the web extends in a plane parallel to the front side or rear side of a second precast concrete wall element forming with the first precast concrete wall element a common vertical joint, and if the strap has reinforcing rods that project substantially at right angles therefrom and that additionally serve for mounting further anchoring elements extending substantially parallel to the plane of the front side or rear side.

In advantageous manner, fastening eyes, for example passage bores, can be provided in the web of the profile member, and the connecting means can be screw connections, bolt connections, threaded rod connections, etc., engaging through these fastening eyes.

When the precast concrete wall elements are mounted the fastening eyes of two adjacent precast concrete wall elements are aligned and the adjacent supports are connected by way of, for example, screws so that the screws are subsequently loaded substantially in shear. However, one of the supports can also have a threaded bolt that is fixedly connected, for example welded therewith and that at the time of mounting the precast concrete wall elements is plugged through the fastening eyes of the support of a further precast concrete wall element and subsequently secured by a nut.

It has proved advantageous if the precast concrete wall element has at at least one of its sides that are joined to a further precast concrete wall element, a first height region with the two supports in a first orientation and if a second height region of the side is provided in which the two supports are arranged in a second orientation, wherein the precast concrete wall elements can be joined together at the level of the respective height regions to be offset relative to one another.

In advantageous manner the web of the profile member of the support can be arranged at an angle relative to the flange of 90° so that the anchoring elements, for example headed bolts, extend by the shank thereof parallel to the wall plane of the wall elements.

According to the invention, the anchoring of, for example, the headed bolts in the concrete of the wall elements can be reinforced if the anchoring elements are provided with a rear suspension reinforcement in tension direction and transverse direction in the form of a surface reinforcement consisting of straight rods with or without hooks.

BRIEF DESCRIPTION OF THE DRAWING

The invention is explained in more detail in the following by way of embodiments illustrated in the drawing, in which.

SPECIFIC DESCRIPTION OF THE INVENTION

Figure 1:
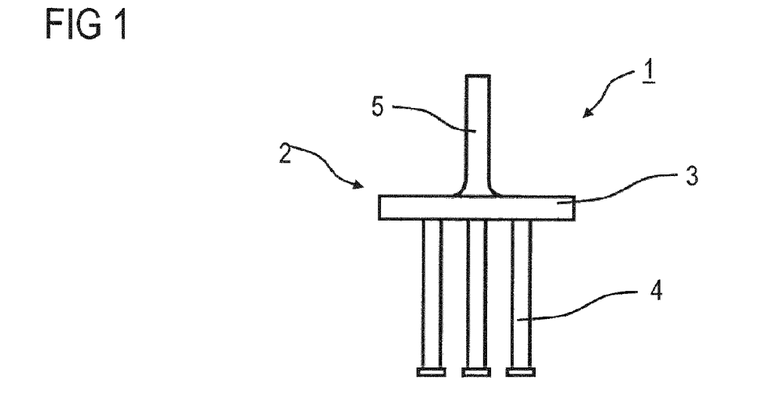
FIG. 1 is a plan view of a support according to the invention.

A support 1 for fastening two wall elements to one another with a profile member 2 is illustrated in FIG. 1 in a view onto its narrow side. A plurality of anchoring elements 4 that —as will be shown in the following—are installed in the wall elements, is mounted on a flange 3, preferably a steel plate.

Figure 2:
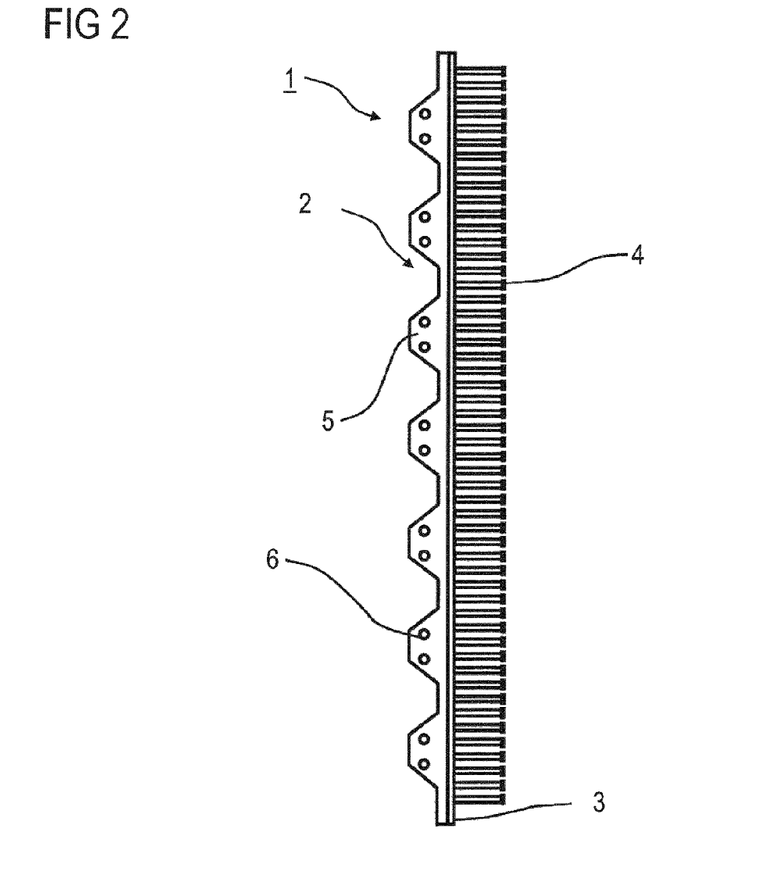
FIG. 2 is a side view of a support according to the invention in accordance with FIG. 1.

A web 5 of the profile member 2 are arranged at the flange 3 as is apparent from, in particular, FIG. 2 that is a side view of the support 1. Fastening eyes 6 by means of which two supports 1 can be connected are provided in the s web 5.

Figure 3:
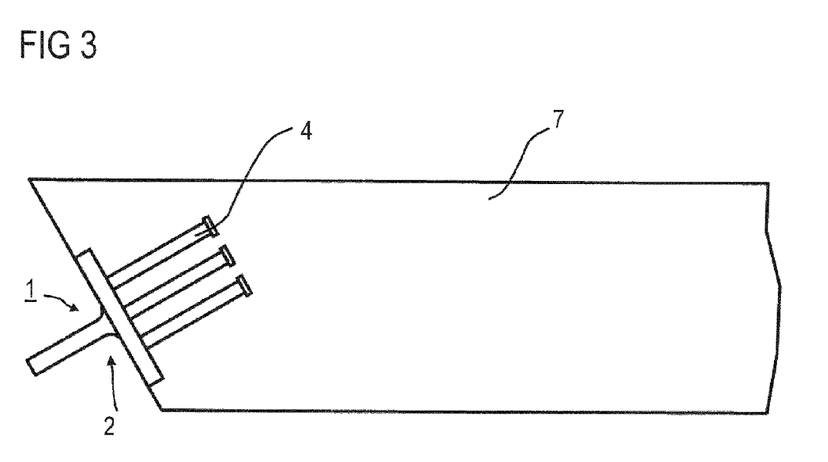
FIG. 3 is a plan view of one side of a precast concrete wall element with the support according to the invention in accordance with FIG. 1.
Figure 4:
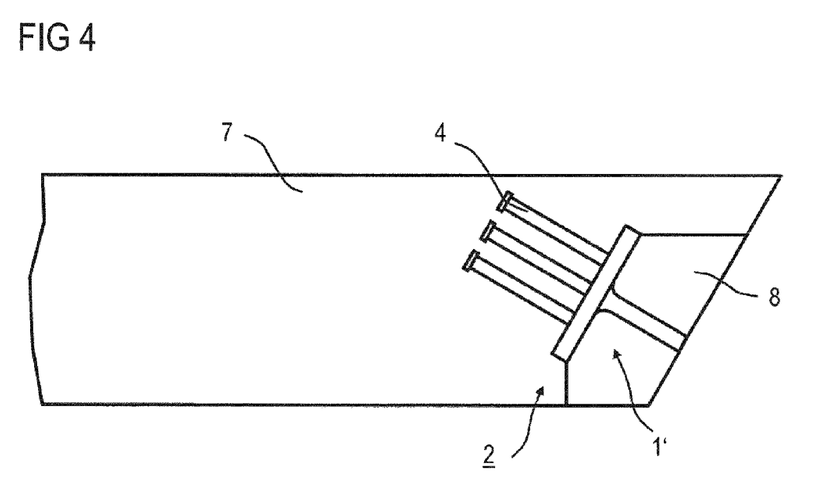
FIG. 4 is a plan view of the other side of a precast concrete wall element with a support recessed according to the invention in accordance with FIG. 1 for connection with the precast concrete wall element according to FIG. 3.

FIGS. 3 and 4 show, in cross-section, an upright precast concrete wall element 7 that comprises two narrow sides arranged at an angle different from 90°, in the illustrated exemplifying case an angle of 60°, an upper side, a lower side, a front side and a rear side. The flange 3 of the support 1 is recessed, so as to be flush on one inclined narrow side illustrated in FIG. 3 so that the anchoring elements 4 are all incorporated in the precast concrete of the wall element 7.

The other inclined narrow side of the precast concrete wall element 7 is illustrated in FIG. 4, this side having a depression or recess 8 in the inclined base of which the flange 3 of a second support 1' is similarly recessed to be flush. The base of the depression 8 is oriented parallel to the narrow side of the wall element 7.

Figure 5:
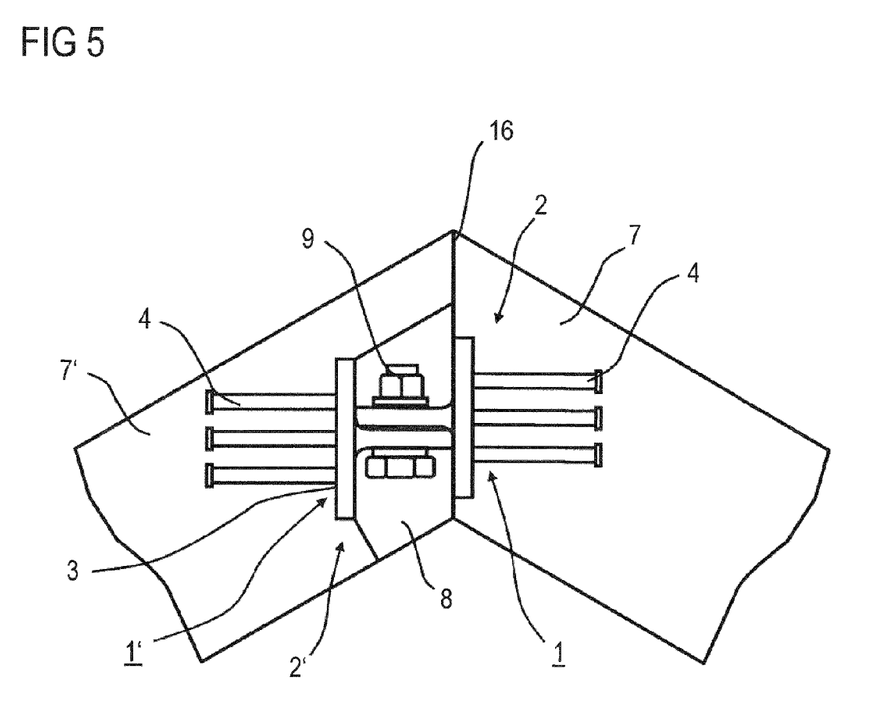
FIG. 5 is a plan view of a connecting point of two wall elements by means of the supports.

It is possible through this arrangement of the two supports 1 and 1' at the wall element 7 to connect together two wall elements 7 and 7' by the narrow sides thereof in a butt joint as shown by way of FIG. 5. The webs of the profile member 2 of the two supports 1 and 1' that are mounted on the narrow sides of the two mutually abutting wall elements 7 and 7' in the described manner, in the assembled state lie one above the other in such a way that they are connectable by way of connecting means 9, for example a screw connection or bolt connection engaging through the fastening eyes 6.

Figure 6:
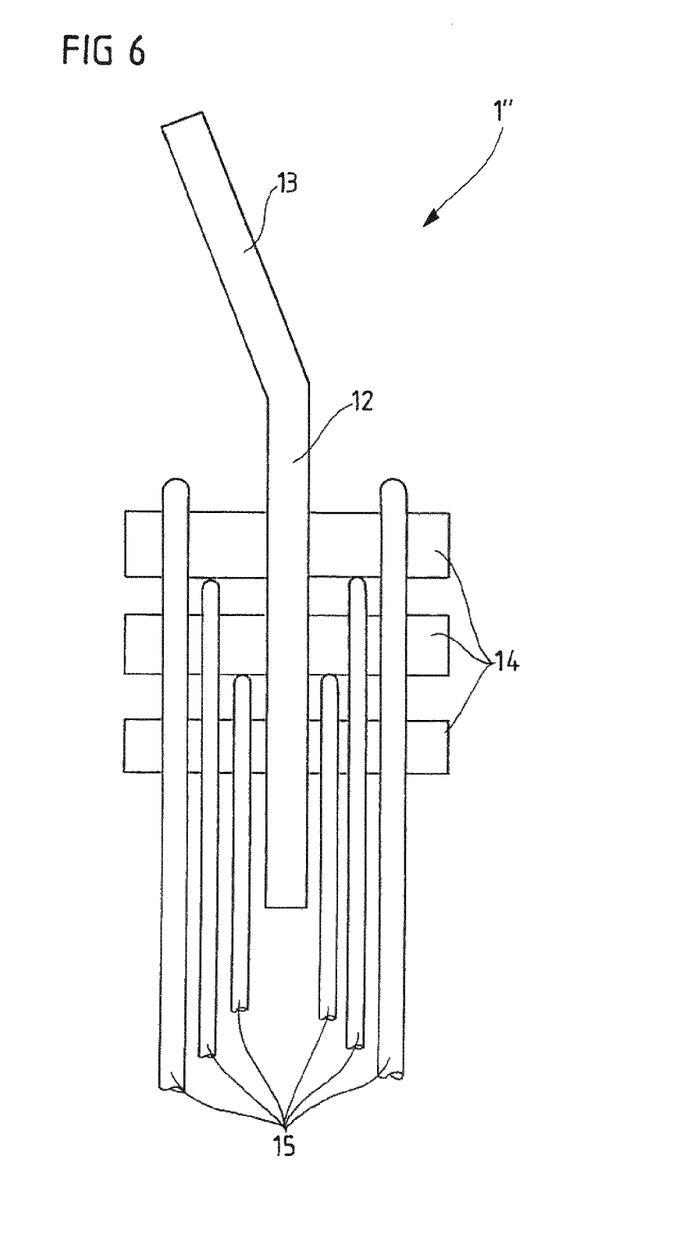
FIG. 6 is a plan view of a further support according to the invention.

FIG. 6 shows a support 1" consisting of a strap 12 having an angled web 13. The angle is determined in accordance with the number of side walls selected for the polygon. Although without doubt even triangular towers are conceivable, usually pentagonal towers or towers with more than five corners are selected, so that as a rule the angle lies between 90° and 180° in correspondence with the number of side surfaces.

The strap 12 is penetrated by anchoring elements 14 that serve for secure retention of the strap 12 in the precast concrete wall elements 7, 7', . . . 7n'.

The tensile strength between strap 12 and precast concrete wall elements 7, 7', . . . 7n' is further increased if reinforcing rods 15 supported or rearwardly anchored at the anchoring elements 14 are provided.

Alternatively, however, the two supports 1 provided in the narrow sides of the precast concrete wall elements 7, 7', . . . 7n' can also be connected with a horizontal transverse connection from side wall to side wall within the wall element 7, 7', . . . 7n' so as to be able to absorb the corresponding forces.

Figure 7:
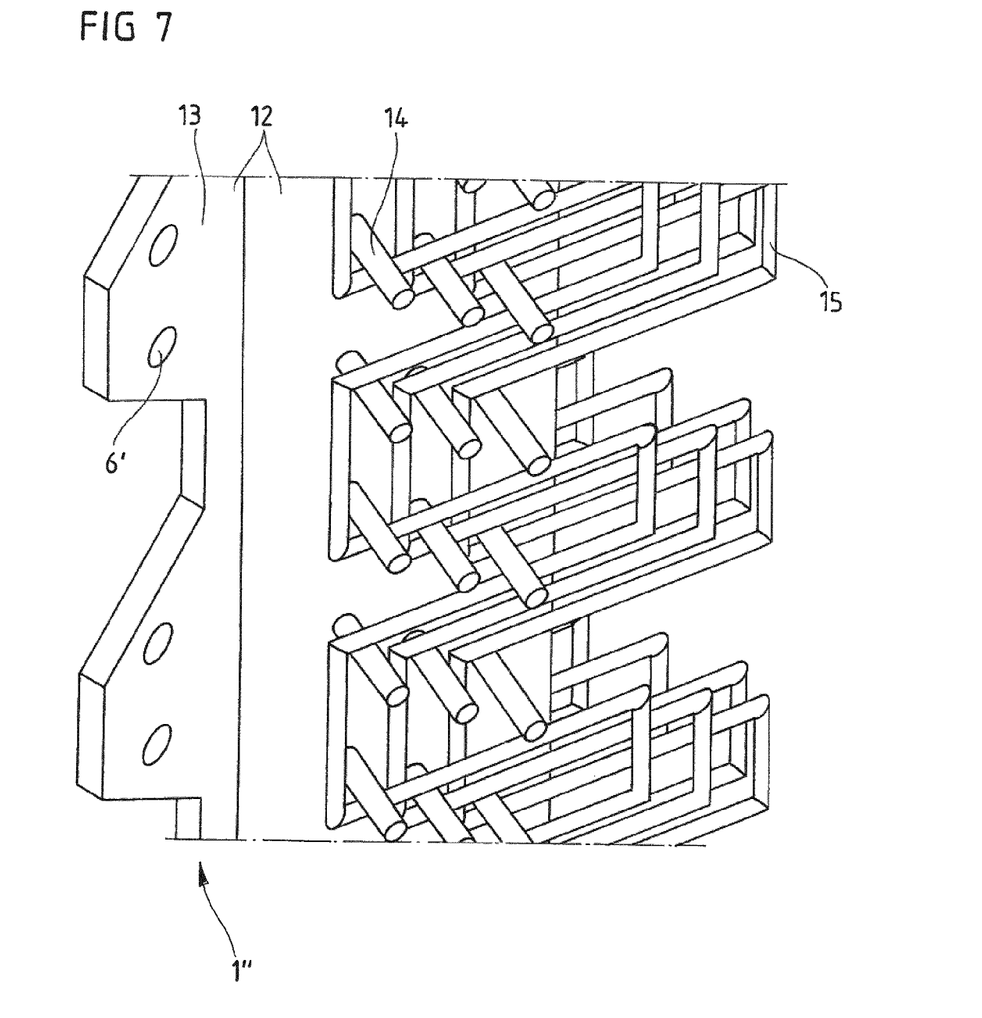
FIG. 7 is a detail of a side view of the support according to FIG. 6.

FIG. 7 shows a detail of a corresponding support 1". Fastening eyes 6' can be seen in the angled web 13 that has a honeycomb form. The part that is cast in the concrete (not shown) of the strap 12 has the anchoring elements 14 and reinforcing elements 15.

Figure 8:
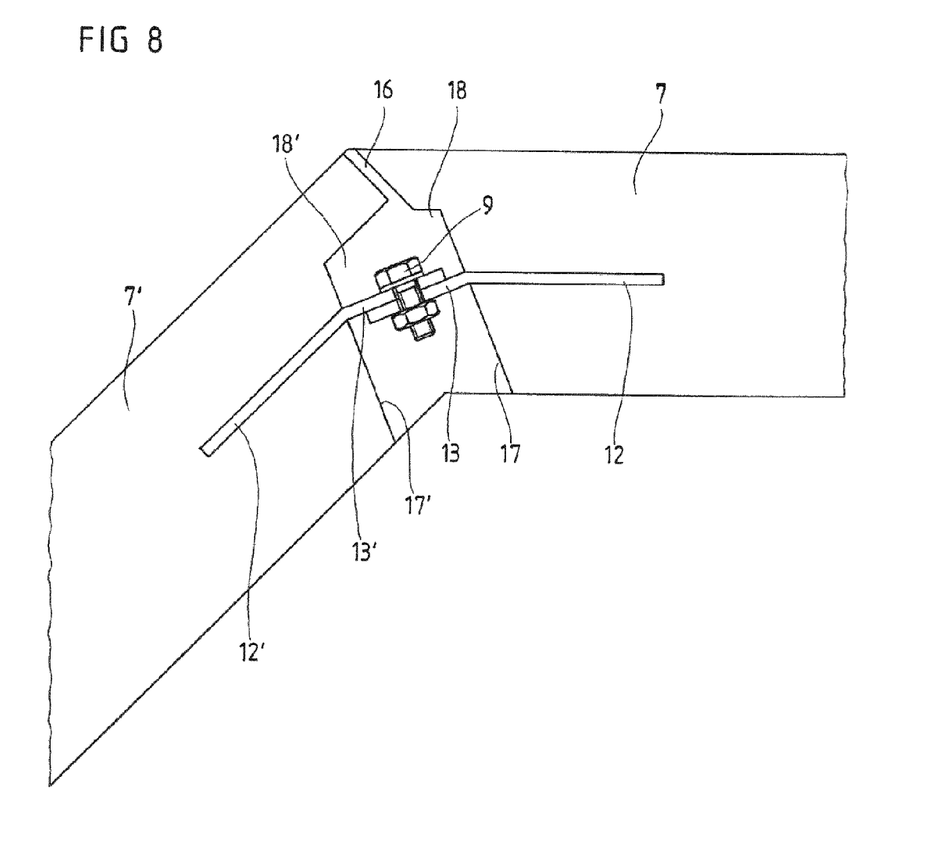
FIG. 8 is a plan view of a connecting point of two wall elements by means of a support according to FIG. 5 or 6 illustrated in simplified form.

FIG. 8 shows a connection of two precast concrete wall element 7, 7' that include therebetween a vertical joint 16. The narrow sides 17 and 17' of the precast concrete wall elements 7, 7' have recesses 18, 18' serving for reception of the webs 13, 13'. The straps 12, 12' are illustrated here in simplified form without reinforcing elements and anchoring elements. The webs 13, 13' are connected by way of connecting means 9, here loaded in shear.

Figure 9:
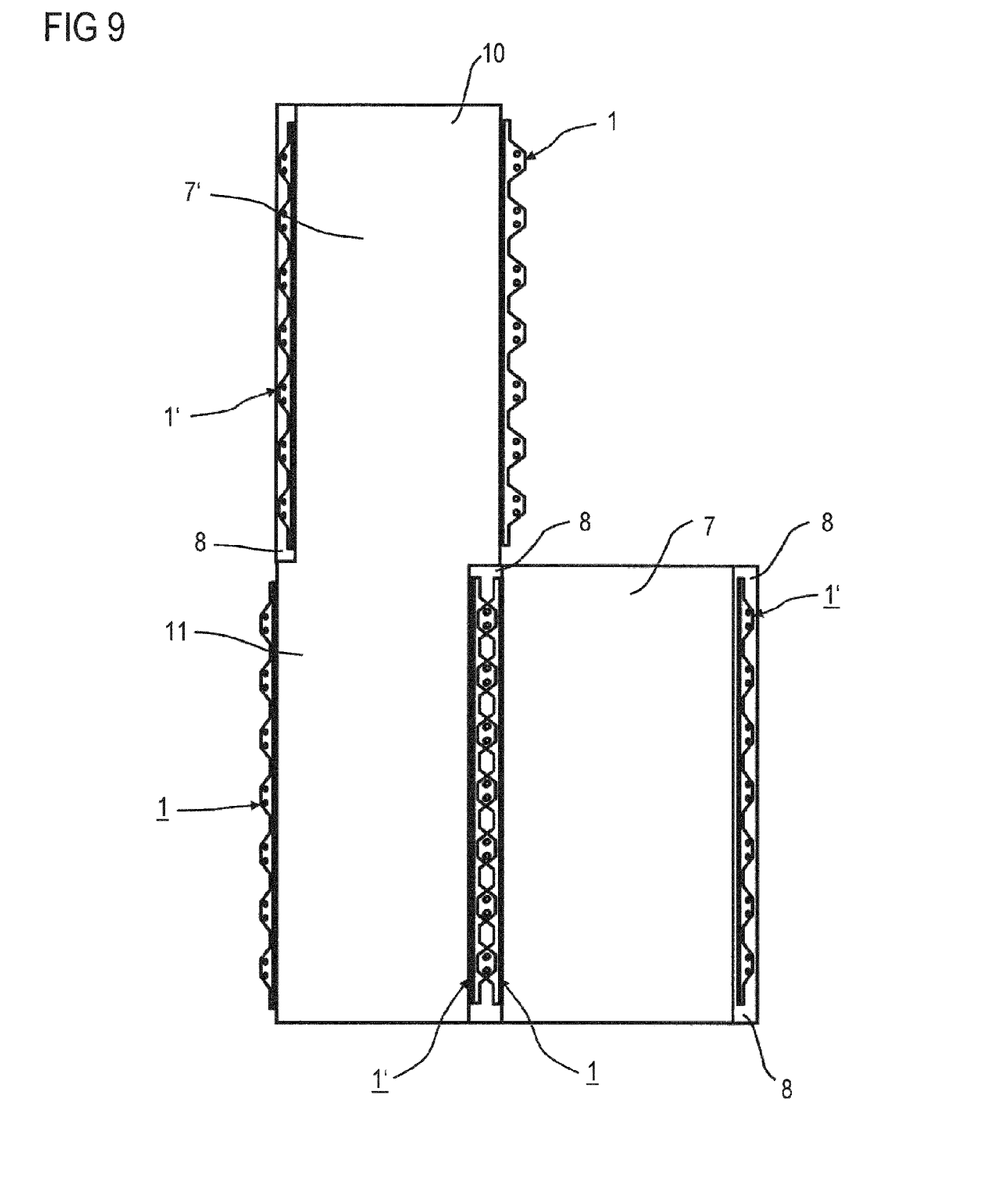
FIG. 9 is two wall elements according to FIG. 5 or 8 connected together.

FIG. 9 now shows the details of two wall elements 7 and 7' that are connected together in accordance with FIG. 5 or 8 in front view. In order that the wall elements 7 and 7' that in the assembled state form a ring or closed polygon of, for example, a tower of a wind-energy installation have a mount already at the time of erecting the wall elements 7 and 7' during assembly they are divided into at least two height regions 10 and 11. In that case, the two supports 1 and 1' are arranged in the height regions 10 and 11 at different narrow sides. Thus, the support 1 in the upper height region 10 is arranged on the right-hand narrow side and the support 1' on the lefthand. On the other hand, this is reversed in the lower height region 11, since the support 1 is mounted on the lefthand narrow side and the support 1' on the right-hand. Advantageously, an entire wall element 7' with two height regions 10 and 11 and a wall element 7 with only one height region are provided in alternation as base elements so that an offset arrangement of the butt joints results.

The supports 1 and 1' or 1" of a precast concrete wall element 7 in that case fit together in complementary manner with the supports 1 and 1' of the second precast concrete wall element 7'. If several precast concrete wall elements 7 and 7' are already joined together, then a further wall element can be joined to the wall elements. In that case, the newly inserted precast concrete wall element is placed on the horizontal upper side of a lower precast concrete wall element and built onto the already standing precast concrete wall elements.

The supports 1 and 1' can be formed by rolling and galvanized after welding of the anchoring elements 4, in which case the anchoring elements 4 due to incorporation in the concrete do not have to be, but can be, galvanized. However, the webs of the profile member 2 can, instead of by a rolling process, also be welded to the flange 3.

The supports 1 and 1' concreted in place and optionally anchored at the back simultaneously serve as a cladding edge. One half of the support is used per side of a wall. Insofar as the supports consist of rolled profile members, it is not necessary to produce any weld connections, as a result of which imperfections due to weld distortion are avoided. The web plates of the supports each have two screw holes at a defined edge spacing or aperture spacing. The anchorage of the supports can be effected by headed bolts that in turn can be provided with a rear suspension reinforcement in tension direction and transverse direction, since the longitudinal thrust along a vertical joint of the concrete shaft produces—referred to the headed bolt—a transverse force or shear force.

The rear suspension reinforcement can be constructed in the form of a surface reinforcement consisting of straight rods with or without hooks. With respect to the wall elements 7 and 7' for a concrete shaft, a rear suspension reinforcement basically in longitudinal direction can be provided in order to anchor the thrust load along a vertical joint.

In order to avoid a vertical fill joint in the case of a concrete construction in modular form, for which appropriate mortar, concrete or synthetic resin would have to be introduced on site, the screw connection according to the invention serves as a force-locking connection between the wall elements 7 and 7'.

Figure 10:
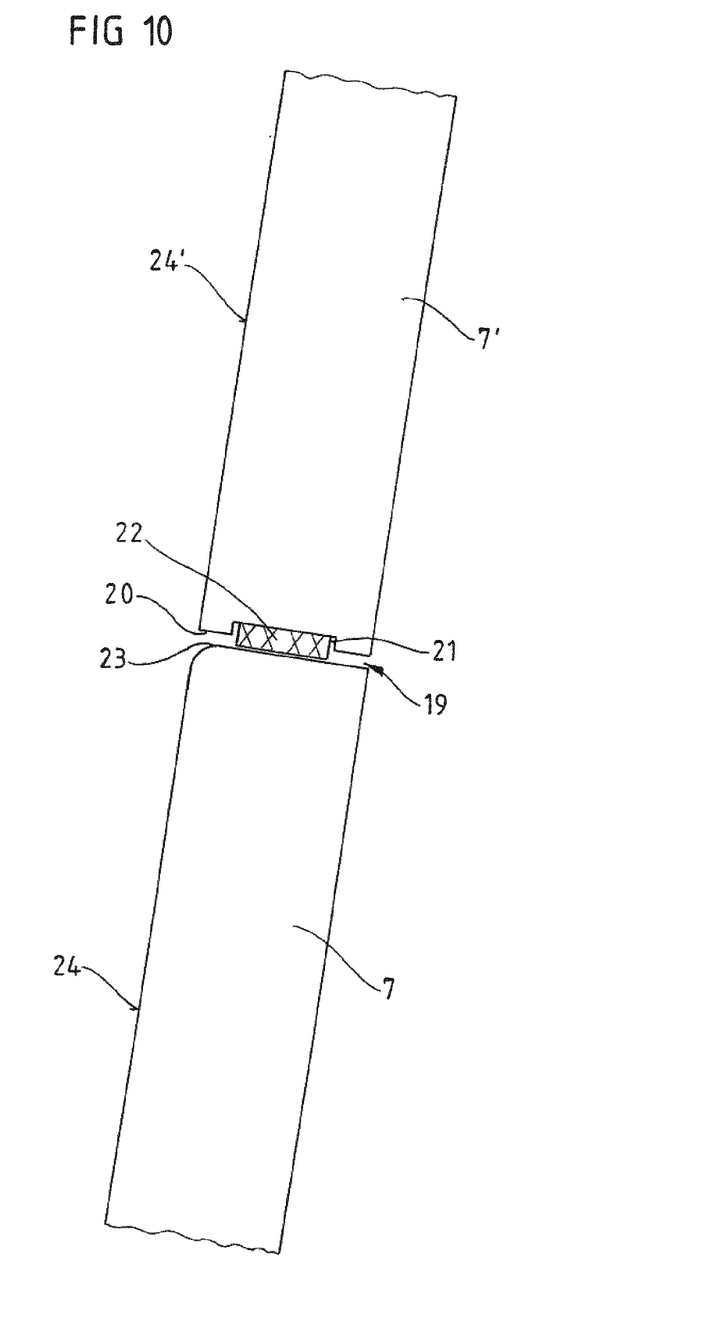
FIG. 10 is two precast concrete wall elements including a horizontal joint therebetween.

FIG. 10 shows, illustrated in broken-away form, a lower precast concrete wall element 7 and an upper precast concrete wall element 7' that form a horizontal joint 19 therebetween. The inclined setting of the precast concrete wall elements 7, 7' in that case signifies the upwardly tapering profile of a tower construction. The lower side 20 of the upper precast concrete wall element 7' has a recess 21 in which a structure bearing 22 supported on the upper side 23 of the lower precast concrete wall element 7 is arranged.

The edge between the front side 24 of the precast concrete wall element 7 and the upper side 23 thereof is radiused so that water removal from the structure bearing 22 is possible.

The invention claimed is:

1. A concrete construction of modular form for a wind-energy installation, the construction comprising
at least two upright precast concrete wall elements alongside one another and one above the other, with two narrow sides that after joining together of the precast concrete wall elements form
a vertical joint therebetween,
an upper side and a lower side that after joining together of the precast concrete wall elements include a horizontal joint therebetween,
a front side and a rear side;
a first support anchored in one of the narrow sides, the opposite narrow side having a recess or depression;
a further support anchored in the recess in such a way that when the narrow sides of the two precast concrete wall elements are assembled with formation of the vertical joint the two supports are connectable by connecting means; and
a reinforced elastomer bearing in a recess or depression of the lower side of the precast concrete wall elements and, when the concrete construction is assembled, supported on the upper side of the precast concrete wall element disposed thereunder to form the horizontal gap, the precast concrete wall element having at least one of its sides that is joined together with a further precast concrete wall element a first height region with the two supports in a first orientation and a second height region, in which the two supports are in a second orientation.

2. The concrete construction according to claim 1, wherein the edge region formed between the front side and upper side is inclined downward.

3. The concrete construction according to claim 1, wherein the supports each consist of a profile member having a flange on which anchoring elements projecting into the concrete for anchorage with the precast concrete wall elements are mounted and on which a web for connecting together two wall elements is mounted.

4. The concrete construction according to claim 1, wherein the supports each consist of a strap having an angled web that has the profile of a and that projects from a respective one of the narrow sides, the angle being selected so that the strap extends in a plane substantially parallel to the front side or rear side of a first precast concrete wall element, while the web extends in a plane substantially parallel to the front side or rear side of a second precast concrete wall element forming together with the first precast concrete wall element a common vertical joint, the strap having anchoring elements that project substantially at right angles therefrom and that in addition can serve for anchoring at the rear of further reinforcing rods extending substantially parallel to the plane of the front side or rear side.

5. The concrete construction according to claim 1, wherein fastening eyes are provided in the web of the profile member or web and that the connecting means engage through these fastening eyes.

6. The concrete construction according to claim 1, wherein the precast concrete wall elements are joined together offset relative to one another at a level of the respective height regions.

7. A concrete construction of modular form for a wind-energy installation, the construction comprising
at least two upright precast concrete wall elements alongside one another and one above the other, with two narrow sides that after joining together of the precast concrete wall elements form
a vertical joint therebetween, an upper side and a lower side that after joining together of the precast concrete wall elements include a horizontal joint therebetween,
a front side and a rear side;
a first support anchored in one of the narrow sides, the opposite narrow side having a recess or depression;
a further support anchored in the recess in such a way that when the narrow sides of the two precast concrete wall elements are assembled with formation of the vertical joint the two supports are connectable by connecting means; and
a reinforced elastomer bearing in a recess or depression of the lower side of the precast concrete wall elements and, when the concrete construction is assembled, supported on the upper side of the precast concrete wall element disposed thereunder to form the horizontal gap, the supports each consisting of a profile member having a flange on which anchoring elements projecting into the concrete for anchorage with the precast concrete wall elements are mounted and on which a web for connecting together two wall elements is mounted, the web of the profile member of the support extending at an angle to the flange of ≤90° and that the anchoring elements extend by the shank thereof substantially parallel to wall planes of the wall elements.

8. A concrete construction of modular form for a wind-energy installation, the construction comprising at least two upright precast concrete wall elements alongside one another and one above the other, with two narrow sides that after joining together of the precast concrete wall elements form
a vertical joint therebetween,
an upper side and a lower side that after joining together of the precast concrete wall elements include a horizontal joint therebetween,
a front side and a rear side;
a first support anchored in one of the narrow sides, the opposite narrow side having a recess or depression; and
a further support anchored in the recess in such a way that when the narrow sides of the two precast concrete wall elements are assembled with formation of the vertical joint the two supports are connectable by connecting means, the supports each consisting of a profile member having a flange on which anchoring elements projecting into the concrete for anchorage with the precast concrete wall elements are mounted and on which a web for connecting together two wall elements is mounted, the anchoring elements each being provided with a rear suspension reinforcement in tension direction and transverse direction in the form of a surface reinforcement consisting of straight rods.

* * * * *